United States Patent [19]
Charles

[11] 4,291,370
[45] Sep. 22, 1981

[54] CORE MEMORY INTERFACE FOR COUPLING A PROCESSOR TO A MEMORY HAVING A DIFFERING WORD LENGTH

[75] Inventor: Larry L. Charles, Fallston, Md.

[73] Assignee: Westinghouse Electric Corp., Pittsburgh, Pa.

[21] Appl. No.: 936,299

[22] Filed: Aug. 23, 1978

[51] Int. Cl.³ .......................... G06F 13/00; G06F 5/00
[52] U.S. Cl. .................................................... 364/200
[58] Field of Search ... 364/200 MS File, 900 MS File; 307/DIG. 1

[56] References Cited

U.S. PATENT DOCUMENTS

| | | | |
|---|---|---|---|
| 3,331,056 | 7/1967 | Lethin et al. | 364/200 |
| 3,380,025 | 4/1968 | Ragland | 364/200 |
| 3,380,030 | 4/1968 | McMahon | 364/200 |
| 3,631,405 | 12/1971 | Hoff et al. | 364/200 |
| 3,638,195 | 1/1972 | Brender et al. | 364/200 |
| 3,739,352 | 6/1973 | Packard | 364/200 |
| 3,740,728 | 6/1973 | Pullen | 364/200 |
| 3,976,979 | 8/1976 | Parkinson et al. | 364/200 |
| 4,027,288 | 5/1977 | Barton et al. | 364/200 |
| 4,090,237 | 5/1978 | Dimmick | 364/200 |
| 4,144,562 | 3/1979 | Cooper | 364/200 |
| 4,145,751 | 3/1979 | Carlow et al. | 364/900 |

*Primary Examiner*—Melvin B. Chapnick
*Attorney, Agent, or Firm*—J. B. Hinson

[57] ABSTRACT

An interface circuit for coupling a digital processor to a core memory. The interface circuit accepts as inputs address signals, data signals, and control signals from the processor and output date from the core memory. The output of the interface circuit consists of control signals to control the memory and a parallel digital data word having 2N bits where N is the number of parallel bits transferred by the digital processor during the execution of an instruction to transfer data to or input data from an external device. To store a digital data word in a particular location in the core memory, the digital processor first transfers a digital data word having N bits to a buffer memory which is a part of the interface circuit. Next, the digital processor executes a store in memory instruction. This instruction causes the normal output data, available on a data bus of the digital processor during the execution of such an instruction along with the N data bits previously stored in the buffer memory to be stored in the core memory at an address location specified by the address available on the address bus of the digital processor. To read data from the core memory the digital processor first executes a read from memory instruction. This instruction causes N bits of a data word stored in the specified memory location to be read directly into the digital processor and the remaining N bits of the word to be transferred to the buffer memory. An input data instruction is then executed to transfer the remaining N bits stored in the buffer memory into the digital processor. Using this technique two instructions are required to store the 2N bit data word in the desired memory location. Similarly, two instructions are required to read a 2N bit data word from a specified location in the core memory.

4 Claims, 8 Drawing Figures

4,291,370

CORE MEMORY INTERFACE FOR COUPLING A PROCESSOR TO A MEMORY HAVING A DIFFERING WORD LENGTH

STATEMENT OF GOVERNMENT INTEREST

The invention herein described was made in the course of or under a Contract No. F33657-72-C-1002 with the U.S. Air Force.

BACKGROUND OF THE INVENTION

1. Field of the Invention

The invention relates to digital processors and more specifically an interface circuit for coupling a digital processor utilizing an N bit data word to a core memory having a data word length of 2 N bits.

2. Description of the Prior Art

The need for interfacing digital processors with memories having different word lengths has existed for some time. The most common technique for accomplishing such an interface, particularly in circumstances where the digital processor utilized a data word having N bits and the memory utilized a data word length 2 N bits was to interface the memory with the processor through a logic circuit which caused each data word of the memory to appear as two data words to the digital processor. This technique permitted the digital processor to communicate directly with the memory without any need for special programming.

SUMMARY OF THE INVENTION

The invention comprises an interface circuit for coupling a digital processor to a memory having a different data word length. The interface circuit includes an (a) N bit bidirectional buffer, (b) circuit means responsive to the execution of an output instruction by the processor to transfer an N bit data word into the bidirectional buffer, (c) circuit means responsive to the execution of a store instruction by the processor to transfer N data bits stored in the bidirectional buffer and N bits from the processor into the memory as a 2 N bit data word, (d) means responsive to a read instruction to read a data word having 2 N data bits from the memory and for transferring N bits of this data word to the data bus of the processor and N bits into the bidirectional buffer, and (e) means responsive to the execution of an input instruction by the processor to transfer an N bit data word from the bidirectional memory into the processor.

DESCRIPTION OF THE PREFERRED EMBODIMENT

Figure 1:
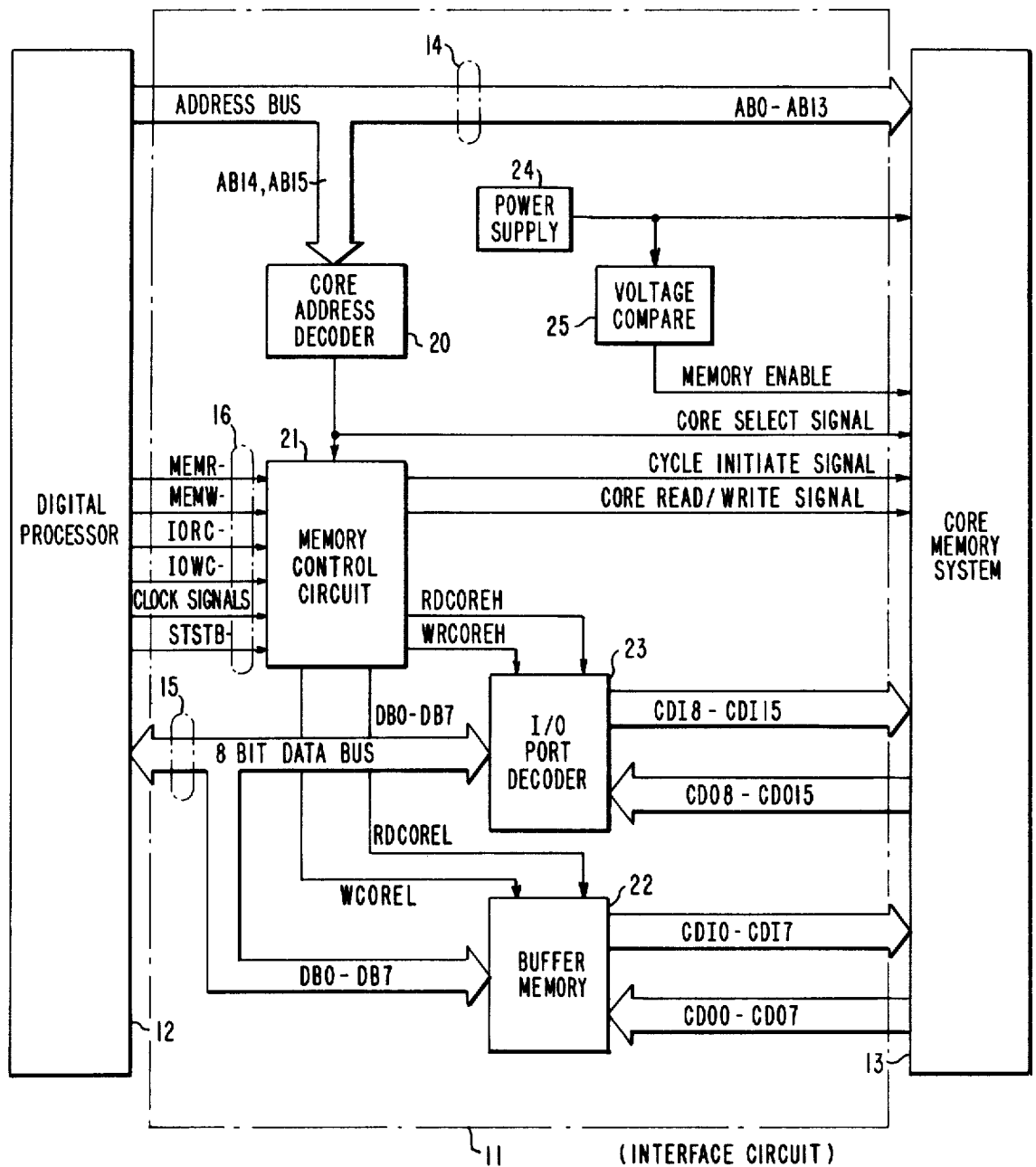
FIG. 1 is a functional block diagram illustrating the interface circuit and its use to couple a digital processor to a memory.

FIG. 1 is a functional block diagram of an interface circuit 11 comprising the preferred embodiment of the invention and illustrating its use to couple a digital procesor 12 to a core memory 13. As is the usual case, the digital processor 12 utilizes a multibit address word available on an address bus 14, a multibit data word available on a data bus 15 and a plurality of control signals available on control lines 16 to communicate with peripheral devices including digital memories. The bits of the address signal are labeled AB0 through AB15. Similarly, the bits of the data word are labeled DB0 through DB7. Since the operation of the interface 11 is independent of the detailed internal organization of the digital processor 12, no details of the processor 12 are illustrated.

The commercially available 8080 microprocessor is used as an exemplary processor to illustrate the operation of the interface circuit 11. The 8080 microprocessor includes program instructions specifically designed to communicate with semiconductor memories and other discrete devices such as tape readers using an eight bit data word. However, digital processors of this class do not provide any standard interface for core memories or memories having a data word length exceeding eight bits.

In the experimental model of the interface 11, the core memory 13 did not include its own internal power supply. Normal operating power was supplied to the core memory 13 by an external power supply 24. The +15, +5 and −12 voltages available at the output terminals of the power supply 24 are coupled to a voltage compare circuit 25 and to the core memory 13. The voltage compare circuit 25 compares each of these voltages to an appropriate reference voltage and generates a memory enable signal which is coupled to the core memory 13 to enable the core memory 13 when the proper power supply voltages are available.

Figure 6A:
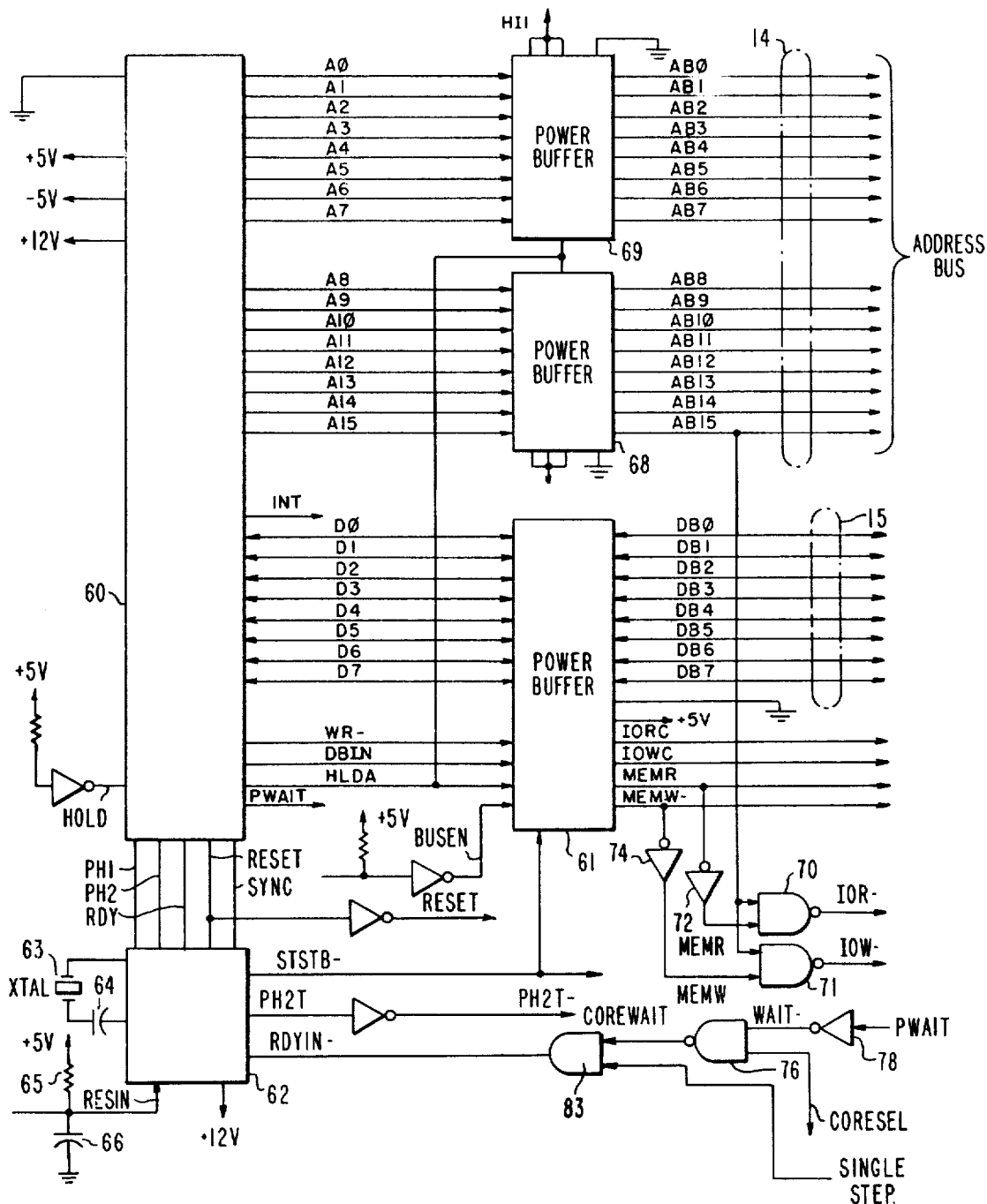
FIGS. 6A and 6B comprise a logic diagram of the interface circuit.
Figure 6B:
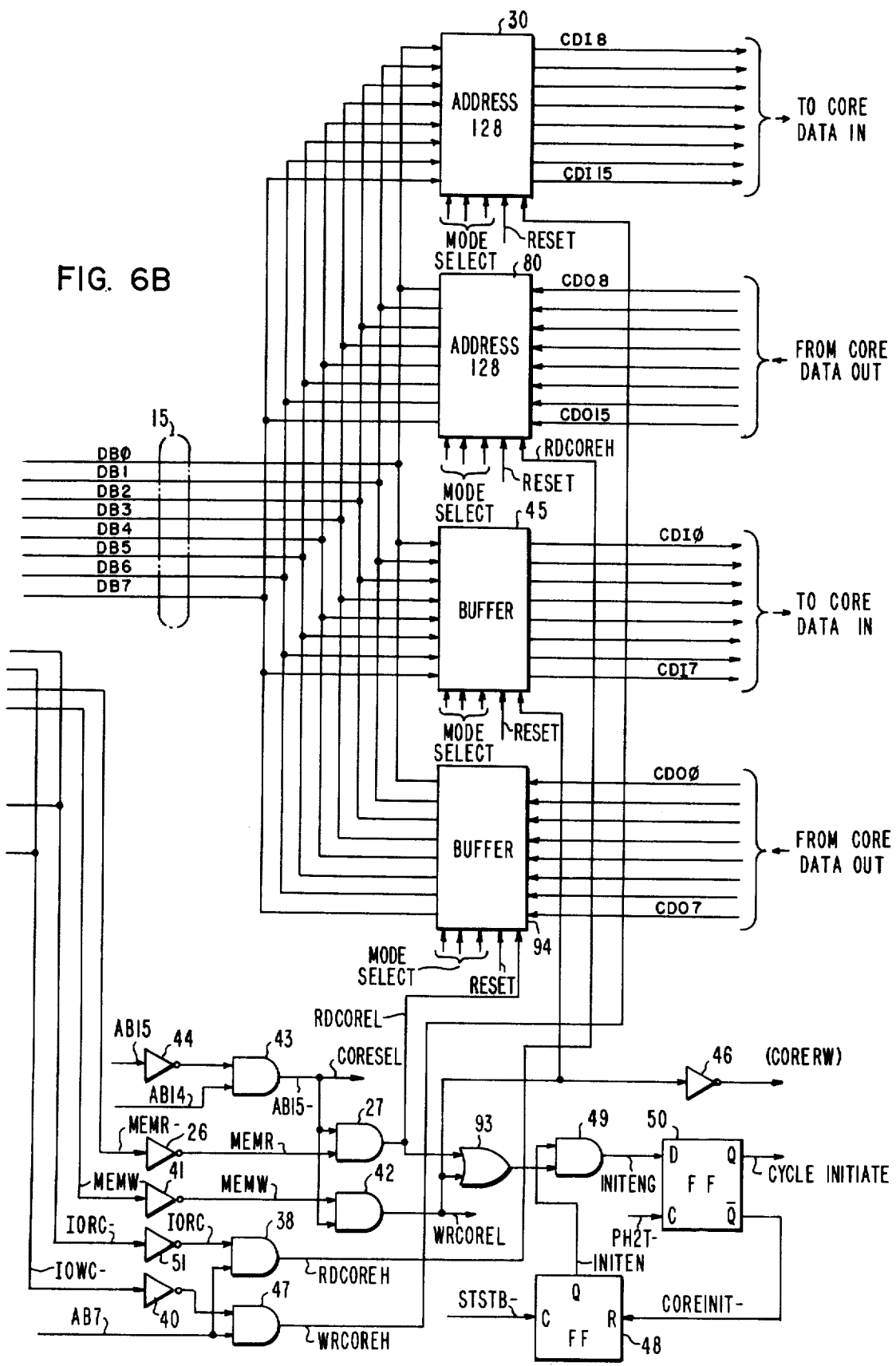
Figure 7:
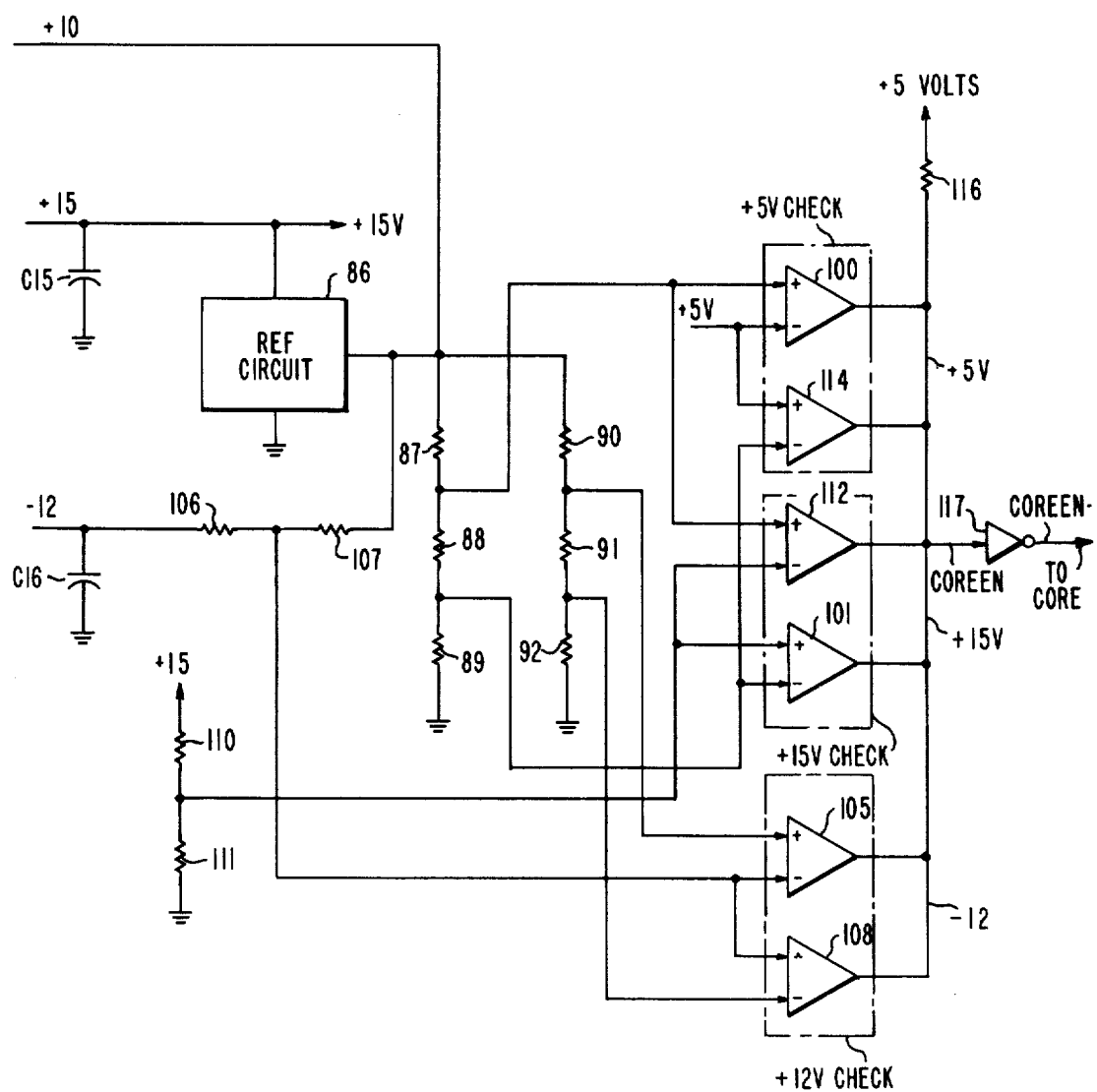
FIG. 7 is a schematic diagram of the power supply monitoring circuit.

The operation of the interface 11 will now be described utilizing the functional block diagram (FIG. 1), the wave form diagrams (FIGS. 2 through 5), the logic diagram (FIGS. 6A and 6B), and the schematic diagram of the power supply monitor (FIG. 7).

The interface 11 is designed to permit transfer of digital data words between the digital processor 12 and core memory 13 using a combination of the instructions designed for communications with a conventional solid-state memory and input/output instructions. Therefore, the interface 11 extends the capability of digital processors, such as the 8080 microprocessor, by providing a means for these processors to communicate with memories, for example, core memories, having a different data word length and control signal requirement.

The 8080 microprocessor used in the experimental model of the interface circuit 11, includes an address bus 14 which provides a sixteen bit parallel address signal, as previously discussed. Sixteen bits provide a capability of addressing 65,536 separate storage locations. The preferred embodiment of the interface 11 is designed to use only a portion of the 65,536 addressing capability of the sixteen bit address signal in communicating with the core memory 13. Specifically, addresses from 16,384 to 32,768 are allocated for communication with the core memory 13. This provides the capability of addressing 16,384 memory locations.

Address bits AB0 through AB13 are coupled directly to the core memory 13 and decoded to identify the individual storage locations of the core memory 13. The fourteenth (AB14) and fifteenth (AB15) bits of the address signal are decoded by the address decoder 20 to generate a core select signal indicating that the number available on the address bus 14 is between 16,384 and 32,768.

When the AB14 bit is a logical "one" and the AB15 bit is a logic "zero", the address decoder 20 generates the core select signal. The core select signal is coupled as an input signal to a memory control circuit 21 and to the memory 13. The memory control circuit 21 also receives as inputs a memory read signal (designated MEMR-), a memory write signal (designated MEMW-), an input read signal (designated IORC-), and an input write signal (designated IOWC-), clock signals (designated PH1, PH2T, and PH2T-), and a status strobe signal (designated STSTB-). The abbreviations for the various control signals are those used in the 8080 microprocessor specifications with the exception of IORC- and IOWC-. The use of these signals in controlling data transfers between the processor 12 and the core memory 13 will be subsequently described in detail.

In response to the signals described above, the memory control circuit 21 generates (1) a core read/write signal to indicate whether the core memory cycle is to be a read cycle or a write cycle, (2) a cycle initiate signal to initiate the cycle of the core memory 13, (3) a read core high signal (RDCOREH) indicating that the upper bits of the data read from the core memory 13 are to be coupled to the data bus 15, (4) a write core high signal (WRCOREH) indicating that the eight data bits present on data bus 15 are to be written into the buffer memory 22, (5) a read core low signal (RDCOREL) indicating that the bits stored in buffer memory 22 are to be coupled to the data bus 15, and (6) a write core low signal (WCOREL) indicating that the data present on the data bus 15 is to be coupled to the lower bit inputs (CD10-CD17) of the core memory 13 via memory buffer 22.

The (RDCOREH) and the (WRCOREH) signals along with an eight bit data word comprising bits (DB$\phi$-DB7) available on the data bus 15 of the processor 12 are coupled as input signals to an I/O port decoder 23. The eight most significant input and output bits, (designated CDO8-CD015 and CDI8-CDI15 of the data word of the core memory 13 and also coupled to the I/O port decoder 23. Similarly, the eight least significant input and output bits of the core memory 13 (designated CDI$\phi$-CD17 and CDO$\phi$-CDO7) are coupled to the buffer memory 22.

In storing data in a specified location in the core memory 13, the processor 12 first executes a conventional output data instruction. This instruction transfers an eight bit parallel digital data word from a storage register in the processor 12 via the data bus 15, into an eight bit digital memory 30 (FIG. 6B) which is a part of the I/O port 23. As with all I/O devices, the memory 30 is assigned an address. For convenience of decoding, the interface 11 was designed such that the buffer memory module 30 is selected and enabled any time an output instruction is executed and the AB7 address bit is a logic "one". Other addressing schemes could have been used.

Figures 2, 5:
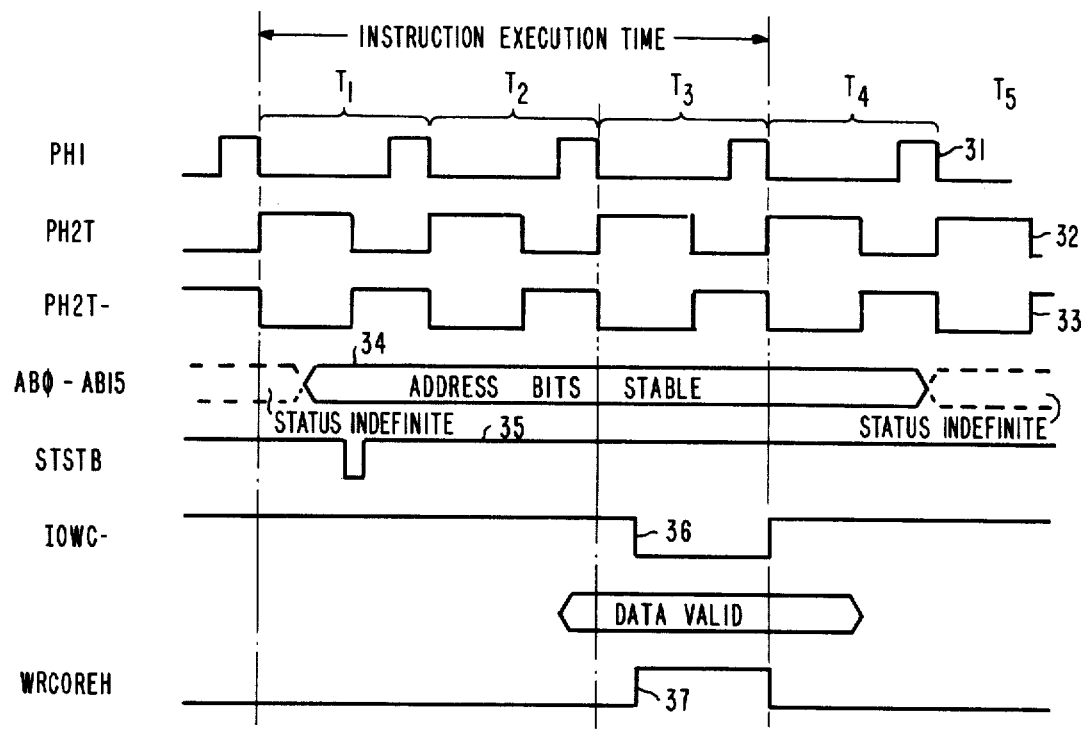
FIGS. 2 through 5 are waveform diagrams illustrating the operation of the interface circuit.

The 8080 microprocessor generates control signals for command execution from a primary clock signal (PH1) illustrated at reference number 31 in FIG. 2. From the primary clock signal (PH1), the 8080 microprocessor generates two auxiliary clock signals labeled PH2T and PH2T- illustrated at reference numerals 32 and 33 of FIG. 2. The basic execution time for the output instruction is three cycles, $T_1$, $T_2$, and $T_3$, of the clock signal PH1 as indicated in FIG. 2. Operation of the interface 11 during the execution of an output instruction will be explained beginning with the point in time when the instruction has been read from the processor program memory.

At a point in time slightly delayed from the beginning of the first clock pulse ($T_1$) of the primary clock signal (PH1) following completion of reading of the output instruction from the processor program memory the bits, AB$\phi$ through AB15, of the address number identifying the device to be communicated with becomes stable on the address bus 14. The interval during which the bits of the address number are stable is identified by reference numeral 34 in FIG. 2.

On the first trailing edge of the PH2T signal 32 following stabilization of the bits of the address number, the 8080 microprocessor generates a status strobe signal labeled (STSTB) 35 (FIG. 2). Following the STSTB pulse, the IOWC-signal 36 switches to its low value for a time interval less than one cycle or the PH1 clock signal 31. The (IOWC-) signal 36 is inverted by inverter 40 (FIG. 6B). The output of inverter 40 and the seventh bit (AB7) of the address signal are coupled as inputs to an AND gate 47 to produce a write core high signal (WCOREH) 37 which is coupled to the input of memory 30 to store in this memory the data word available on the data bus 15. A reset signal generated by the processor 12 resets memory 30 when the digital processor 12 is originally turned on. Memory 30 is preferably an integrated circuit type MC8212/B available from Intel. The mode signals are always the same state and are so selected that the data stored in this memory is always available at its output.

The next step in storing a digital data word to the selected location in the core memory 13 is for the processor 12 to execute a conventional store in memory instruction. The execution of this instruction will be explained with reference to the timing chart illustrated in FIG. 3 and the detailed logic diagram, FIGS. 6A and 6B. The clock signals, PH1, PH2T and PH2T-, the address bits and the status strobe signal (STSTB) respectively illustrated at reference numbers 31 through 35 are identical with those described above. Therefore, the detailed description of these signals will not be repeated. The basic instruction execution time of three clock pulses, $T_1$, $T_2$, and $T_3$ is extended one clock period (TW) using the wait feature of the 8080 microprocessor. The extra time represented by the one cycle (TW) is desirable in order to assure that adequate time is allowed for the core memory 13 to complete its store cycle.

Following stabilization of the address bits 34, the STSTB signal 35 and the second pulse of the clock signal (PH1) 31, the memory write signal (MEMW-) 54 goes low. This signal is inverted by an inverter 41 (FIG. 6B) to generate a signal (MEMW) which is coupled to a first input to an AND gate 42. The second input to the AND gate 42 is the output signal of another AND gate 43. The fifteenth bit (AB15) of the address number is inverted by an inverter 44 and coupled to a first input of the AND gate 43. The second input to the AND gate 43 is the fourteenth bit (AB14) of the address. This generates at the output of AND gate 43 the high level of the core select signal (CORESEL) 53 whenever the address number is between 16,384 and 32,768. Core select signal (CORESEL) 53 rises when the address bits are stabilized and exists for the remainder of the cycle.

The core select signal (CORESEL) 53 and the memory write signal (MEMW), generated by inverting the MEMW- signal 54 by an inverter 41, are coupled as inputs to AND gate 42 to generate a write core low (WRCOREL) signal 57 which is coupled to a buffer memory 45 (FIG. 6B) to gate the data available on the data bus 15 to the input of the core memory 13. The output signal of the AND gate 42 is also inverted by an inverter 46 to generate the core read/write (CORERW) signal which indicates to the core memory 13 whether the cycle is to be a read cycle or a write cycle with the high level of this signal indicating a read cycle and the low level indicating a write cycle.

Figure 3:
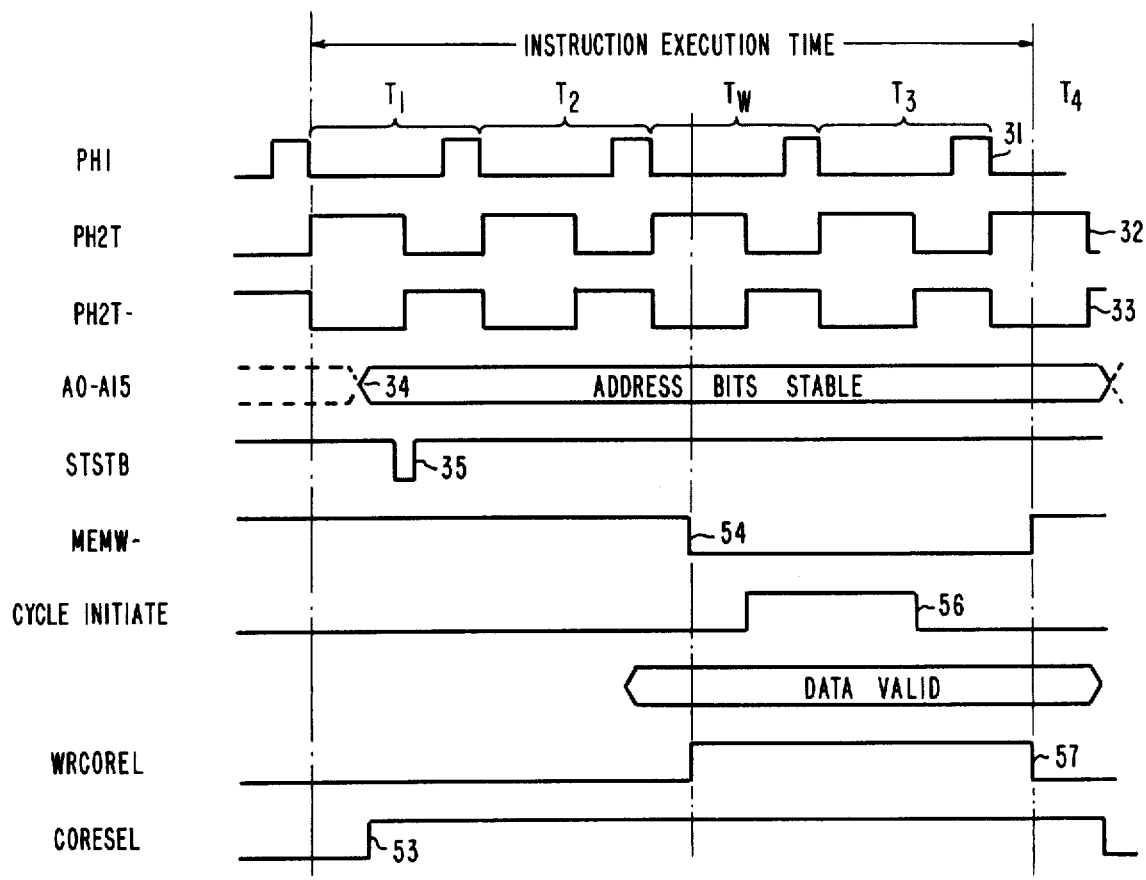

The output signal of the AND gate 42 is also coupled through an OR gate 47. A timing flip-flop 48 is clocked by the status strobe signal (STSTB) 35 to set the Q output to a logic "one" state. The output of OR gate 47 and the Q output of the timing flip-flop 48 are combined in an AND gate 49 to generate a signal at the "D" input of a core initiate flip-flop 50. Core initiate flip-flop 50 is clocked by the PH2T signal. This causes the output of this flip-flop to be set to generate the cycle initiate signal 56 (FIG. 3). The cycle initiate signal 56 is coupled to the cycle initiate input terminal of the core memory 13. Timing flip-flop 48 is reset by the $\overline{Q}$ output of the core initiate flip-flop 50. Cycle initiate signal 56 in combination with the address bits available on the address bus 14 and the core mode signal, cause the data available on data bus 15 to be gated through buffer memory module 45 and combined with the eight bits previously stored in the buffer memory 30 to form a sixteen bit data word which is stored as a sixteen bit data word into the core memory 13 at a storage location specified by the AB0 through AB13 bits of the address signal available on the address bus 14.

The store in memory instruction is normally executed in three clock periods, $T_1$, $T_2$, and $T_3$ of the clock signal PH1 signal. However, the 8080 microprocessor has the capability of extending the execution time for one period of the clock signal PH1 in response to an external signal. In the experimental model constructed, the execution of this instruction was extended for the additional clock period Tw. The logic for performing this function is subsequently described because it is common to the execution of the store in and read from memory instructions.

Buffer memory module 45 is preferably an integrated circuit type MC8212/B available from Intel. Buffer memory 45 is reset by a reset signal when the digital processor 12 is initially turned on. The other more select signals always have a constant value and are selected to cause buffer memory module 45 to operate as described above.

To read data from the core memory 13 the processor 12 first executes a read from memory instruction. This instruction causes the data stored at the location specified by the AB$\phi$ through AB13 bits of the address number available on the address bus 14 (FIG. 1) to be read from the core memory 13. This data is transferred into two buffer memories 56 and 57. These memories, 56 and 57, are preferably integrated circuit types MC8212/B available from Intel. The data transferred to the buffer memory 56 is transferred directly through this memory into the data register of the processor 12 via the data bus 15. The transfer of the data stored in the buffer memory 57 requires a conventional input instruction to be executed as subsequently described.

Figure 4:
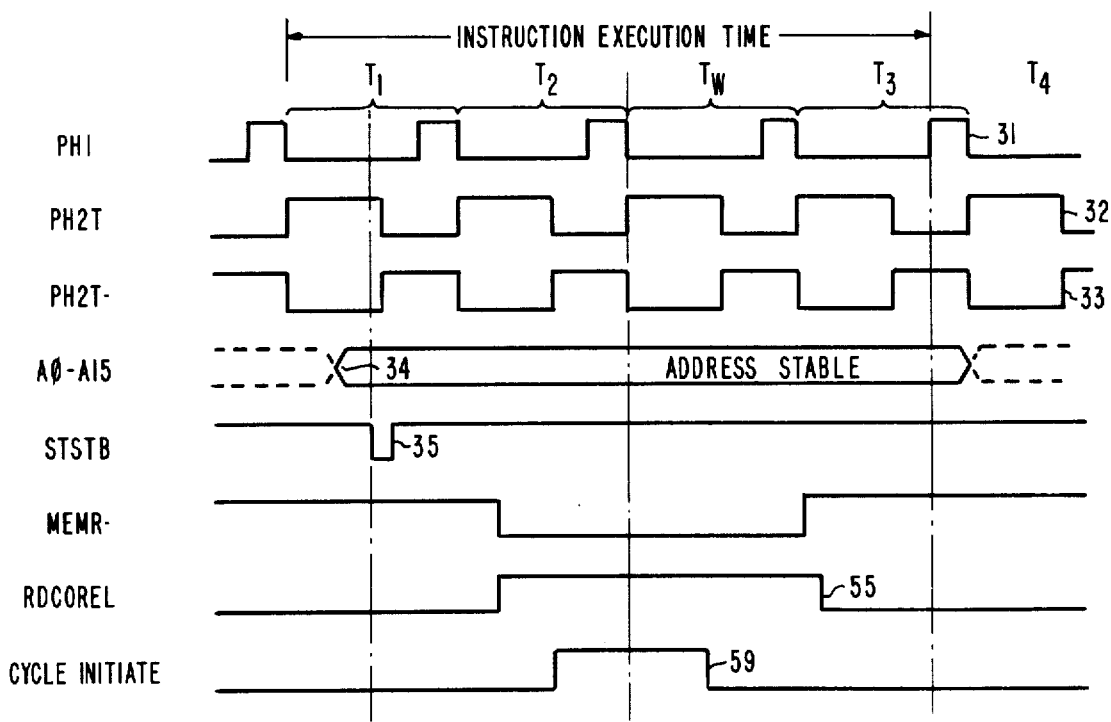

The timing for the core read instruction is illustrated in FIG. 4. In executing this instruction the processor 12 also generates clock signals, PH1, PH2T and PH2T-, and address signal and a status strobe signal (STSTB) respectively illustrated at reference numerals 31 through 35. These signals are identical to the corresponding signals previously described with respect to the other instructions. Therefore, these signals will not be described in detail.

Address bits AB14 and AB15 are decoded as previously described with respect to the execution of the store in memory instruction to generate the core select signal (CORESEL). The MEMR-SIGNAL is inverted by an inverter 26 to generate the MEMR signal. An AND gate 27 receives as inputs the core select signal (CORESEL) and the (MEMR) signal to generate the read core low signal (RDCOREL) 55. The timing flip-flop 48 is clocked by the status strobe signal (STSTB) to set the Q output to a logic "one". The Q output of the timing flip-flop 48 and the (RCODREL) signal, coupled through OR gate 47, are coupled as inputs to an AND gate 49 to enable the core initiate flip-flop 50 to be set generating the cycle initiate signal 59. Cycle initiate signal 59 is coupled to the core memory 13 causing a 16 bit data word stored at a storage location specified by the AB0 through AB13 bits of the address number available on the address bus 14 to be read. The $\overline{Q}$ output of the core initiate flip-flop 50 is coupled to timing flip-flop 48 thereby resetting this flip-flop.

Eight bits of the data word read from core memory 13 are coupled through a buffer module 56, by the (RDCOREL) signal 55, to the data bus 15 and transferred directly into a register of the processor 12. With respect to these eight bits of data, the read memory instruction operates in the usual manner. This completes the transfer of eight bits of the data word stored in the specified storage location into the processor 12 with all sixteen bits being available on the data output lines of the core memory 13 because the core memory used with the experimental model of the interface 11 included a data buffer register. The remaining eight bits are transferred into the processor 12 by the execution of an input instruction, as described below.

The execution of the memory read instruction also utilizes an extra period Tw of the clock signal PH1. Logic for extending the execution time of the memory read and the memory write instructions is subsequently described.

Transfer of the data word from the specified memory storage location in core memory 13 to the processor 12 is completed by transferring the remaining eight bits from the buffer memory 57 into the processor 12 by the execution of an input data instruction. In executing this instruction, the processor 12 generates the clock signals, PH1, PH2T and PH2T-, address signals, and a strobe signal (STSTB) respectively illustrated as reference numerals 31 through 35. These signals were previously discussed and therefore will not be described again in detail. The timing signals for the execution of the input data instruction are illustrated in FIG. 5.

On the rise of the first pulse of the PH2T signal following the (STSTB) signal, the input data signal (IORC-) illustrated at reference numeral 59 goes low. This signal is coupled to the input of an inverter 37. The output signal of inverter 37 and the seventh bit (AB7) of the address are coupled as input signals to an AND gate 38. The output signal of AND gate 38 is the (RDCOREH) signal which is coupled to the enable input of the buffer memory 57 to couple the data available from the core memory 13 to the data bus 15. This data is then transferred to the register in the processor 12 in the normal manner. Buffer memory modules 56 and 57 are preferably integrated circuits type MC8212/B available from Intel. These modules are reset when the processor 12 is turned on and the mode signals are selected to cause these modules to operate as described above.

Other circuitry which is not strictly a part of the interface 11 is included in FIGS. 6A and 6B. However, this circuitry is necessary in order for the 8080 microprocessor to operate. This circuitry includes the circuitry for generating the signals which extend the execution times for the instructions previously referred to. This additional circuitry will now be described.

The basic 8080 microprocessor consists of three integrated circuits commercially available as type Nos. MC8080A/B, MC8228/B and MC8224/B. These circuits are illustrated at the reference numerals 60, 61 and 62 and may be purchased from Intel. This integrated circuits comprising the 8080 microprocessor also require +12, +5 and −5 bias voltages which must be supplied by an external power supply.

External clock frequency control components comprising a series coupled crystal 63 and a capacitor 64 are coupled to the MC8224/B module. A resistor 65 and a capacitor 66 form a charging network that allows the MC8224/B to generate a reset pulse at power turn-on. Reset can be initiated manually by coupling the junction of the resistor 65 and the filter capacitor 66 to ground. The MC8224/B module also receives a ready input signal (RDYIN) and generates the status strobe signal (STSTB-). The 8080 microprocessor will execute instructions whenever the ready input signal (RDYIN) is a logic one.

The MC8080A/B module 60 generates as an output signal a sixteen bit parallel address signal. The lines on which the bits of this address signal are available have been labeled A$\phi$ through A15, with A$\phi$ being the least significant bit and A15 being the most significant bit. To provide additional fan-out capability, the bits A$\phi$ through A15 of the address signal are amplified by two MC8212 buffer modules, 68 and 69. These modules are also commercially available from Intel. The output terminals of the buffer modules 67 and 68 are the address bus 14 utilized by the interface 11 and the core memory 13. Similarly, the bits of the data words are available on data lines, labeled D$\phi$ through D7, and the control signals from the MC8080A/B module 60 are coupled through the MC8228/B module 61 to generate the data bits DB$\phi$ through DB7 on the bus 15 and the control signals.

In the experimental model of the interface 11 the execution of an instruction to store a word in or read a word from the memory 13 was indicated by the AB15 bit having a logic "one" value. The AB15 bit is coupled to the first input of two NAND gates, 70 and 71. The memory read signal (MEMR-) and the memory write signal (MEMW-) are inverted by two inverters, 72 and 74. The output signals of the inverter 72 and 74 are respectively coupled to the second input of NAND gates 70 and 71 to form the IOR- and IOW-signals. This permits memory instructions having an address greater than 32,768 to be used to communicate with other I/O devices utilizing the IOR- and the IOW-signals respectively available at the output terminals of NAND gates 70 and 71. This mode of operation is generally referred to in the art as "memory mapped I/O".

Execution time for the read from or write into the core memory 13 can be extended one cycle of the PH1 clock signal by controlling the (RDYIN) line to the MC8224/B 62. A delay of one PH1 clock period is introduced into the execution time of the read from or store in core memory 13 instructions by coupling the core select signal (CORESEL) in one input of a NAND gate 76. A (PWAIT) signal from the 8080 microprocessor module 61, which is normally "zero", is inverted by an inverter 78. The output signal of the inverter 78 is coupled to the second input of the NAND gate 76 to generate at the output terminal of this gate a logic "zero" signal if the core select signal (CORESEL) is a "one". This zero goes through the AND gate 83 and causes the RDYIN-line to be "zero". This causes the 8080 to enter a "wait state" which results in PWAIT going high thereby disabling NAND gate 76 causing RDYIN- to go to a logic "one" so that the 8080 microprocessor will start running on the next cycle. The other input to AND gate 83 is from single stepping signal that is used for maintenance only.

Additionally, the +5, +15, and −12 voltage sources which are provided by power supply 24 and supply power to the core memory are monitored by a monitor circuit (FIG. 7) to assure that they are within the desired limits before the core memory 13 is enabled. Most specifically, the +15 volt supply is coupled to a precision reference circuit 86 to generate a precision reference voltage. The precision reference voltage, available at the output terminal of the reference circuit 86, is divided by first and second resistor networks respectively comprising resistors 87, 88, 89 and 90, 91 and 92.

The first resistor divider network generates two reference voltages, the first being available at the junction of resistors 87 and 88, the second being available at the junction of resistors 88 and 89. A comparator 100 compares the first reference voltage to the +5 volt power supply to generate a logic zero signal whenever the +5 volt signal is above a preselected high limit. A second comparator 114 compares the second reference voltage to the +5 volt power supply to generate a logic zero whenever the output voltage of this power supply is less than a preselected minimum limit.

The second resistor divider network comprising resistors 90, 91 and 92 similarly generates third and fourth reference voltages respectively available at the junction of resistor 90 and 91 and resistors 91 and 92. A third comparator 105 compares the third reference voltage to a voltage generated at the junction of two resistors 106 and 107, which are series coupled between the −12 volt power supply and the output of reference circuit 86 to give a scaled −12 volt sample. Comparator 105 generates at its output a logic zero whenever the output voltage of this −12 volt power supply is less than a preselected limit.

A fourth comparator 108 similarly compares the fourth reference voltage to the scaled output voltage of the −12 volt power supply to generate a logic zero whenever the output voltage of this power supply is greater than a preselected limit.

A resistor divider network comprising two series connected resistors, 110 and 111, is coupled between the output terminal of the +15 volt power supply and ground to give a scaled +15 volt sample. A fifth comparator 112 compares the voltage at the junction of resistors 110 and 111 to the first reference voltage to generate a logic zero signal whenever the output voltage of the +15 volt power supply is greater than a preselected limit. Similarly a sixth comparator 101 compares the scaled sample of the +15 volt power supply to the second reference to generate a logic zero signal whenever the output voltage of the +15 volt power supply is below a preselected limit.

A resistor 116 is series coupled between a terminal formed by connecting the output terminals of comparators 100, 101, 105, 108, 112 and 114 in common and a +5 volt voltage source to generate a logic one signal whenever the output voltage of the +15, +5 and −12 power supplies are within normal operating limits. If any of the three voltages is not within normal operating limits, a logic "zero" signal is generated. The output signal at the common output terminal of comparators 100, 101, 105, 108, 112 and 114 is inverted by an inverter 117 to generate a logic zero signal to enable the core memory 13 when all voltages are present and within tolerance.

The various integrated circuits described above with respect to Intel part numbers are also available from other vendees, National Semiconductor, for example. Core memory 13 is also a commercially available item. In the experimental model of the interface 11, a core memory Model SEMS-9 manufactured by Electronic Memory and Magnetic Corporation was used. A functionally equivalent memory is also sold by Data Products Corporation as Model No. ARMS-9. The other logic functions and circuits can be implemented using commercially available components. Core memories having either more or less storage locations are also useable by suitable modification of the addressing scheme. Memories having different timing requirements are also useable by suitable modification of the logic generating the control signals for the core memory. All these modifications can be accomplished without any modification of the basic scheme for communicating with the core memory 13 using a combination of the processor memory control and input/output instructions.

I claim:

1. An interface circuit for coupling a digital processor having an address bus, an N bit data bus and a data word length of N bits to a memory having 2 N bit data input and data output buses, an address bus and a data word length of 2 N bits where N is an integer, comprising:
   (a) means for coupling said address bus of said processor to said address bus of said memory;
   (b) an N bit bidirectional buffer coupling the data bus of said digital processor to the data input and data output buses of said memory;
   (c) means responsive to the execution of an output instruction by said digital processor to transfer a data word having N bits from said processor into said bidirectional buffer;
   (d) means responsive to the execution of a store instruction by said digital processor to transfer said data word having N bits stored in said bidirectional buffer and a data word having N bits from said processor into said memory as a data word having 2 N bits at a storage location determined by an address signal present on said address bus of said processor;
   (e) means responsive to the execution of a read instruction by said digital processor to read from an address specified by an address signal present on said address bus of said processor, a data word having 2 N bits from said memory and transfer a data word having N bits to said ditigal processor and a data word having N bits into said bidirectional buffer; and
   (f) means responsive to the execution of an input instruction by said digital processor to transfer a data word having N bits from said bidirectional buffer into said processor whereby;
   (g) said interface circuit couples said N bit data bus of said processor to said 2 N bit data input and data output buses of said memory.

2. An interface circuit in accordance with claim 1 wherein an address signal available on said address bus of said processor comprises sixteen bits with at least one bit being coupled to address decode means to identify addresses assigned to said memory and the remaining bits being coupled to said memory and decoded thereby to identify the individual storage location comprising said memory.

3. An interface circuit in accordance with claim 2 wherein said remaining bits being coupled to said memory identify individual storage locations and the least significant bits of said address signal.

4. An interface circuit in accordance with claim 3 wherein said at least one bit of said address signal which is coupled to said address decode means comprises the most significant bit of said address signal.

* * * * *